United States Patent [19]

Endo et al.

[11] Patent Number: 4,573,772
[45] Date of Patent: Mar. 4, 1986

[54] INVERTED-DESIGN MICROSCOPE

[75] Inventors: Itaru Endo; Yasuo Inoue, both of Hachiouji, Japan

[73] Assignee: Olympus Optical Co., Ltd., Tokyo, Japan

[21] Appl. No.: 646,513

[22] Filed: Aug. 31, 1984

[30] Foreign Application Priority Data

Sep. 5, 1983 [JP] Japan .................................. 58-137657
Sep. 5, 1983 [JP] Japan .................................. 58-137658

[51] Int. Cl.$^4$ ...................... G02B 21/14; G02B 21/22
[52] U.S. Cl. .................................... 350/526; 350/528; 350/509; 350/515
[58] Field of Search ................................ 350/523–528, 350/520–522, 530, 502, 507–510, 514–516

[56] References Cited

U.S. PATENT DOCUMENTS

| 1,788,712 | 1/1931 | Foster | 350/528 |
| 2,418,602 | 4/1947 | Richards | 350/526 |
| 3,493,285 | 2/1970 | Howard et al. | 350/526 |
| 4,210,384 | 1/1980 | Meyer et al. | 350/523 |

OTHER PUBLICATIONS

Friedrich K. Mollring, "IM35 and ICM40S Inverted Microscopes . . . ", Zeiss Inf. (Germany), vol. 23, No. 86, pp. 18–20, Jan. 1978.
"Unitron Inverted Microscopes for Biology: MIC Series", adv. Unitron Instrument Co., 6 pages, 1965.

Primary Examiner—Jon W. Henry
Attorney, Agent, or Firm—Cushman, Darby & Cushman

[57] ABSTRACT

An inverted-design microscope wherein, in order to make an effective micro-operation and microscope observation possible and to make it easy to set and replace system accessories and samples to be observed, holding means capable of holding a plurality of accessory devices together are mounted rotatably respectively a plane vertical to an optical axis and a plane parallel with the optical axis above a stage. The holding means are mounted so as to be movable in parallel with the optical axis by a manual operation.

9 Claims, 8 Drawing Figures

INVERTED-DESIGN MICROSCOPE

BACKGROUND OF THE INVENTION (a) Field of the Invention

This invention relates to improvements of an inverted-design microscope wherein a condenser lens is arranged above a stage and an objective is arranged below the stage so that an object placed on the stage may be observed from below the stage.

(b) Description of the Prior Art

Today, in the study of biocells in the medical, biological and genetic engineering fields, a microscope has come to be used to remove a nucleus from a cell, to transplant the structure within a cell, to inject a slight amount of an enzyme or medicine into a cell or to measure the electric resistance of a cellular substance. The size of such object is several microns to scores of microns. Therefore, such manual operation is called a micro-manipulation or micro-operation and is considered to be very effective to understanding various sides of the life phenomenon. Thus the microscope has come to be necessary not only as a mere observing instrument but also as an operating instrument.

However, with the conventional microscope as seen as a microscope for the micro-operation, it has taken much time even only to replace the accessory device in the shift merely from a phase difference microscopy to a differential interference microscopy and it has required much toil to set such accessory device. Further, in injecting a slight amount into a cell, not only the micro-injecting device itself but also many of such additional devices as a phase difference device for viewing transparent cells and a stereomicroscope for fixing the position of the needle point of the injecting device are required to be set. Therefore, there have been problems that a larger space on the desk and more time and toil are required.

Further, it is attempted to systematize the inverted-design microscope to correspond to various objects to be studied. All of such system accessory settings before the observation and replacements during the observation as the warmth keeping box setting, micro-manipulator setting, large culture vessel replacement, stage replacement and revolver replacement relate to the stage and are manufold. However, in the structure of the conventional microscope of this kind, there have been problems that the condenser holder or the like arranged adjacently above the stage interferes with such system accessory settings and replacements as are mentioned above and makes such works so complicated as to be impossible in some case.

Therefore, in order to solve the above mentioned problems, for example, in an inverted-design microscope mentioned in Japanese Patent Publication No. 37848/1982, a pillar for supporting an illuminating system including a light source and condenser lens is so formed as to bend rearward (outward of the microscope body) as its base portion. However, in this case, the effect of removing the obstacle is not sufficient. Also, at the time of setting the manipulator, the sample on the stage will not be well illuminated and therefore a new complicacy will occur. Further, in the structure, there has been a problem that it is difficult to secure the durability and precision of the hinge part of the pillar. Further, in the structure of a known universal inverted-design microscope, only the condenser holder part is removed upward. In this case, the same as in the above, the removing effect is not sufficient and there has been a problem that, when the stage is replaced or the warmth keeping box is set, the obstacle will remain and the condenser holder removed upward will intercept the illuminating light and a new complicacy will accompany the replacement and setting.

SUMMARY OF THE INVENTION

In view of the above mentioned problems, a primary object of the present invention is to provide an inverted-design microscope wherein system accessories and samples to be observed are made easy to set and replace and the operability is high.

According to the present invention, this object is attained by a formation wherein a rotary pillar provided with an arm for holding such accessory device as a condenser lens above a stage is mounted rotatably around a pillar erected on a microscope body and holding an illuminating system. Thereby, for example, the shift from the phase difference microscopy to the differential interference microscopy can be made easily and quickly and an efficient microscope observation is made possible.

According to a preferred formation of the present invention, a plurality of arms are arranged at regular intervals around a rotary pillar and are mounted respectively movably in the longitudinal direction of the rotary pillar respectively through manually operable rack-pinion means. Thereby, the operability is made higher and an efficient micro-operation is made possible.

According to another preferred formation of the present invention, on the arm, a holder for holding the above mentioned accessory device is supported rotatably within a flame parallel with the pillar. Thereby, the condenser holder or the like can be moved three-dementionally above the stage and therefore the system accessories and samples to be observed can be very easily set and replaced.

According to further another preferred embodiment of the present invention, the holder is pivoted on the arm through a pivot fitted rotatably to the arm and secured to the holder and a manually operating means for adjustably giving a frictional force between the pivot and arm. Thereby, the holder can be maintained as it is in any rotated position with respect to the arm and any operation on the stage can be made easy and quick.

This and other objects of the present invention will become more apparent during the course of the following detailed description and appended claims.

DESCRIPTION OF THE PREFERRED EMBODIMENTS

Figure 1:
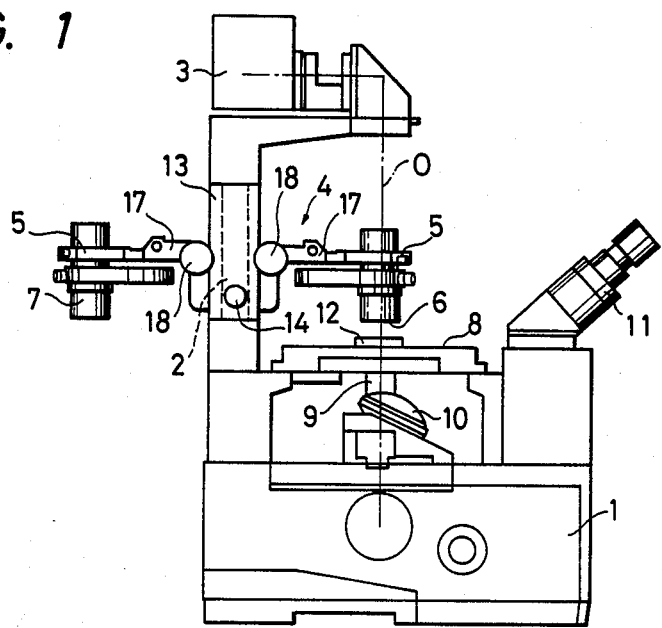
FIG. 1 is a schematic side view of an embodiment of the inverted-design microscope according to the present invention.
Figure 3:
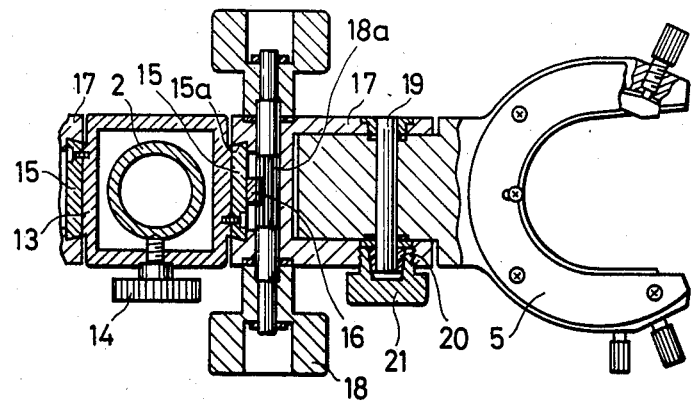
FIG. 3 is a horizontally sectioned view showing the structure of the holding device part.
Figure 2:
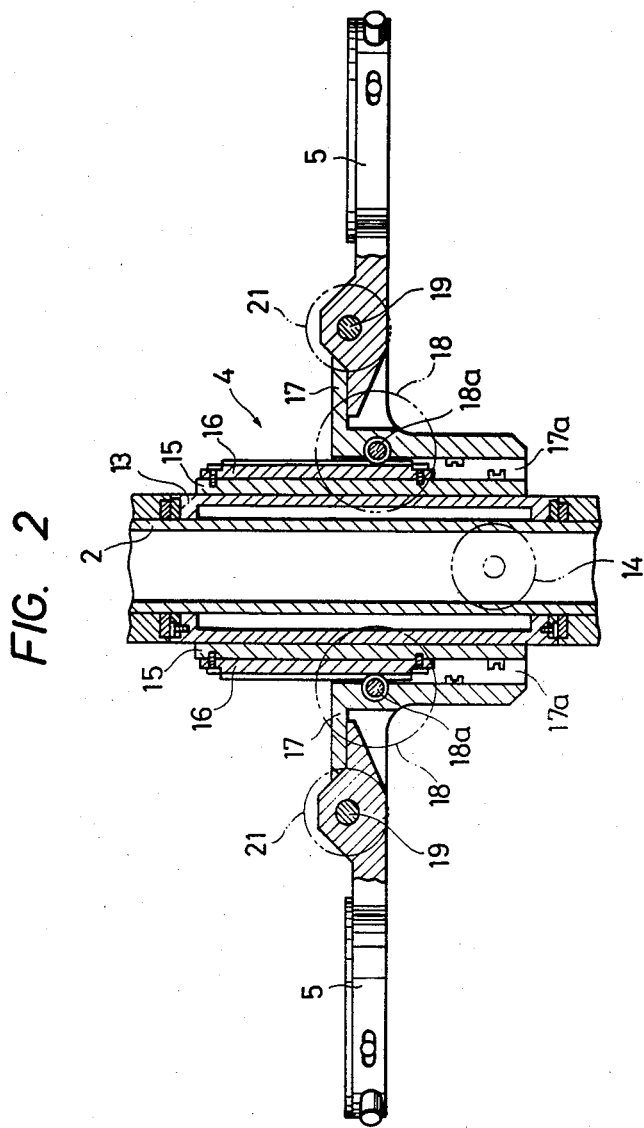
FIG. 2 is a vertically sectioned view showing the structure of a holding device part.

First of all, with reference to FIGS. 1 to 3, the reference numeral 1 denotes a microscope body, 2 denotes an illuminating system supporting pillar erected in the perpendicular direction, 3 denotes a light source device, 4 denotes a holding device installed so as to be rotatable in a plane perpendicular to an optical axis 0 in the perpendicular direction and provided with a pair of holders 5, 5 in symmetrical positions, 6 denotes such phase difference device as a phase difference observing condenser lens held by the right side holder 5, 7 denotes such differential interference device as a differential interference observing condenser lens held by the left side holder 5, 8 denotes a stage, 9 denotes an objective, 10 denotes a revolver supporting the objective 9, 11 denotes an observing tube and 12 denotes a sample placed on the stage 8. FIGS. 2 and 3 are vertically sectioned views showing in detail the structure of the above mentioned holding device 4. The reference numeral 13 denotes a rotary pillar mounted rotatably in a horisontal plane (vertical to the optical axis 0) on the pillar 2, 14 denotes a clamp knob screwed to the rotary pillar 13 and capable of fixing the rotary pillar 13 in any desired rotating position by being screwed in, 15, 15 denote a pair of dovetails fixed in symmetrical position and extending in the perpendicular direction, 16, 16 denote a pair of racks fixed respectively on the dovetails 15, 15 and extending in the perpendicular direction, 17, 17 denote a pair of arm having respectively at one end dovetail groves 17a, 17a respectively fitting the dovetails 15, 15, 18, 18 denote a pair of vertically moving knobs respectively pivoted horizontally and having pinions 18a, 18a fixed mounted on the respective shaft parts and meshed with the respective racks 16, 16, 19, 19 denote pivots secured to the respective holders 5, 5 to support the holders 5, 5 rotatably in the perpendicular plane (parallel with the optical axis 0) on the respective arms 17, 17. 20 (FIG. 3) denotes an elastic bush made of a synthetic resin, fitted to one end part of the pivot 19 and tapered so as to be smaller outward, 21 denotes a clamp knob fitted slidably to the bush 20 with a taper coinciding with the outer periphery of the bush and having a screw part provided on the outer periphery screwed with the arm 17. When this clamp knob 21 is screwed in, it will more strongly compress the bush 20 to increase the frictional force between the pivot 19 and bush 20 and, when it is loosened, it will decrease the frictional force between the pivot 19 and bush 20 so as to be able to more easily rotate the holder 5 with respect to the arm 17. In the above, with reference to FIG. 3, the structure of connecting the arm 17 and holder 5 with each other has been explained only with the right side arm of the rotary pillar 13. However, also with the left side arm, the structure is the same as has been already described and therefore its explanation shall be omitted.

As the inverted-design microscope according to the present invention is formed as described above and the holding device 4 has a pair of holders 5, 5, the two accessory devices of the phase difference device 6 and differential interference device 7 can be installed together to the microscope. If the clamp knob 14 is loosened, the holders 5, 5 will be able to be rotated freely in a plane vertical to the optical axis 0 integrally with the arms 17, 17, rack 16, 16, dovetails 15, 15 and rotary pillar 13 and, when the clamp knob 14 is screwed in, the holders 5, 5 will be able to be fixed in any desired rotated position together with the above mentioned members. Therefore, either desired accessory device of the phase difference device 6 and differential interference device 7 can be very easily arranged within the light path. Thus, for example, the shift from the phase difference microscopy to the differential interference microscopy can be made very easily within a short time and the operability is high. By the way, generally, in the observation with the differential interference device 7, a brighter and less halated image will be obtained but there is a defect that the operating distance is short. In order to compensate this defect, it will be effective to use the phase difference device 6 having a long operating distance.

Figure 4:
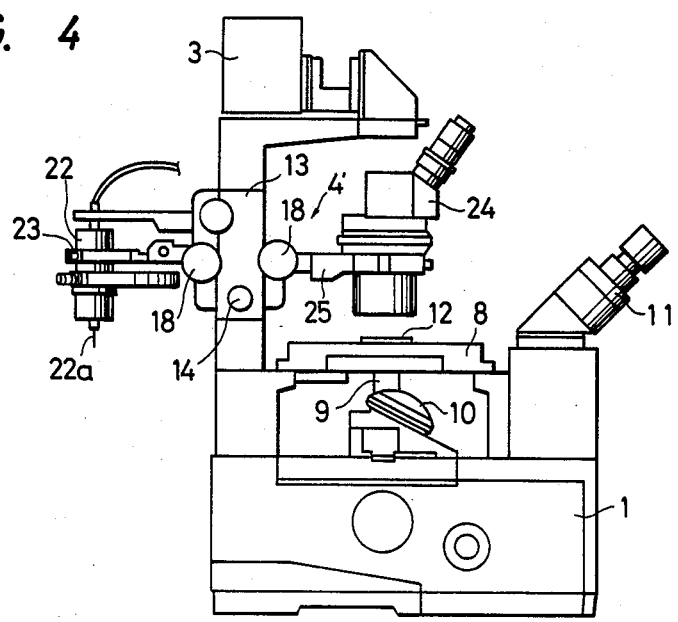
FIG. 4 is a schematic side view of a second embodiment of the present invention.

FIG. 4 shows a second embodiment of the present invention. In a holding device 4' in this case, a holder 23 holding a phase difference injecting device 22 and a holder 25 holding a streomicroscope 24 are symmetrically installed to the ratary pillar 13. According to this embodiment, a very efficient injecting operation is possible. That is to say, in the genetic engineering and generative biological fields, a substance is taken into living cells from outside to analyze various sides of the life phenomenon. As evident from the procedure wherein the colony formation or the like of cells cultured in such culturing vessel as a dish is first checked with the stereomicroscope 24 of a low magnification and the cells adapted to the experiment are sorted, the injection device 22 is then set, the injection is made into the cells and the results are checked with the stereomicroscope 24, the combination of the stereomicroscope 24 with the injecting device 22 produces the effect of making the injecting operation efficient. The injecting part of the injecting device is called a micropipette 22a. This is made by pulling a glass tube of an outside diameter of 1 mm. containing a core with a microelectrode puller and the outside diameter (about 0.1 to 0.4 $\eta$m.) of its tip part and the shape of the needle are varied with the temperature of said puller and the intensity of the magnetic field. The stereomicroscope 24 is used also to check the needle point after the desired micropipette 22a is made.

Figure 5:
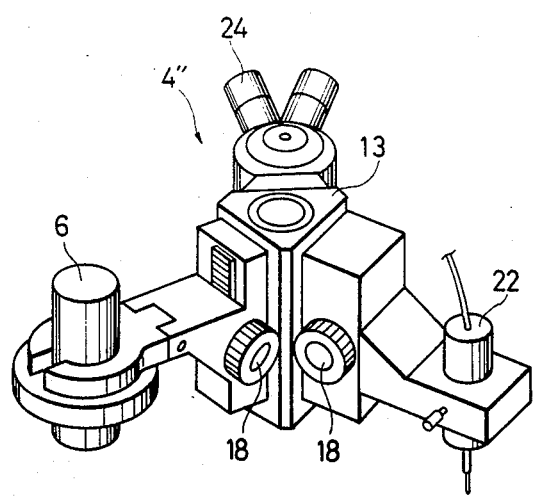
FIG. 5 is a schematic side view of a third embodiment of the present invention.

FIG. 5 shows a third embodiment. In this case, a holding device 4" is so formed as to be able to support at regular intervals the stereomicroscope 24, injecting device 22 and phase difference device 6 having a long operating distance concentrically with the rotary pillar 13. Therefore, according to this embodiment, a more efficient injecting operation is possible.

By the way, in the inverted-design microscope according to the present invention, as examples of providing two accessory devices, not only the above mentioned first and second embodiments but also three kinds of combinations of the phase difference device and injecting device, of the phase difference device and micromanipulator and of the streomicroscope and micromanipulator are possible. As examples of providing three accessory devices, not only the above mentioned third embodiment but also a combination of the phase difference device and injecting device is possible.

Figure 6:
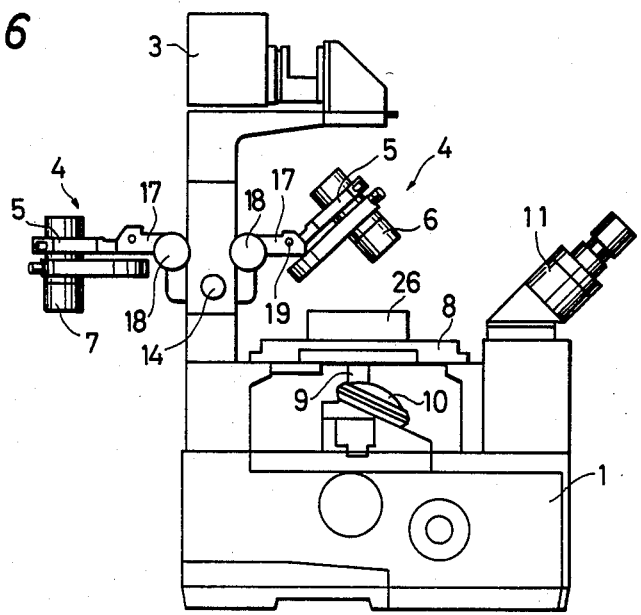
FIG. 6 is the same schematic side view as FIG. 1 in case the posture of a phase difference device is changed.
Figure 7:
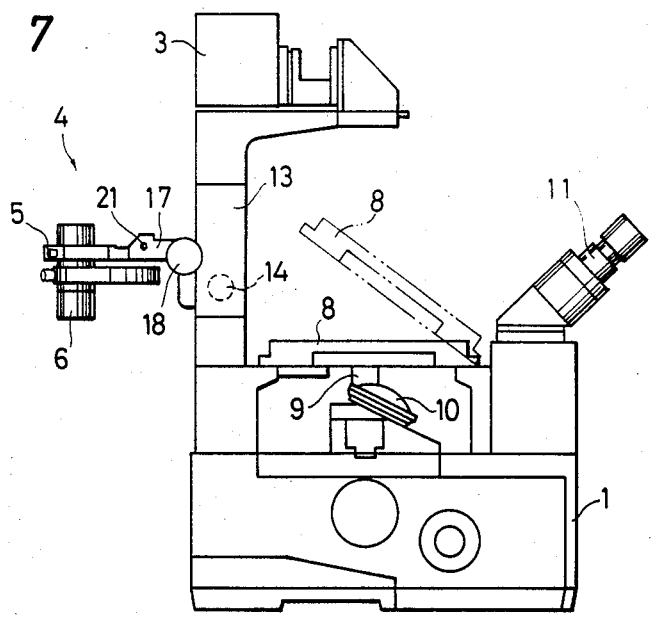
FIGS. 7 and 8 are schematic side views in case the position and posture of the holding device in a fourth embodiment are changed.
Figure 8:
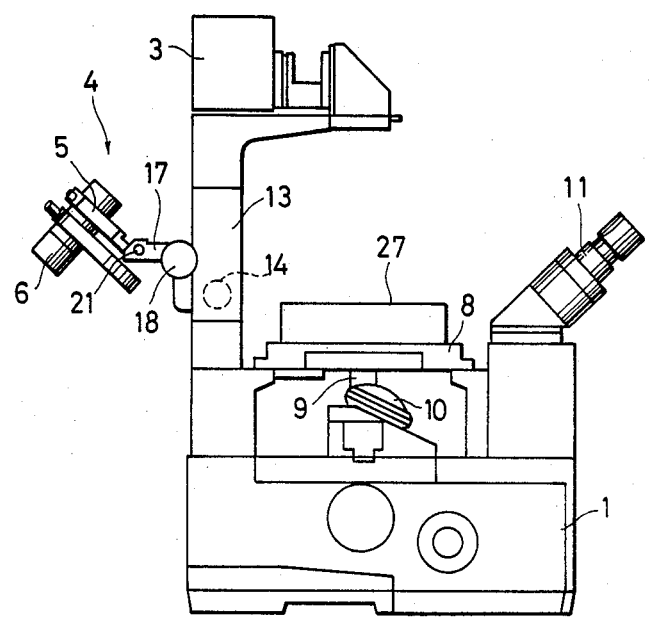

Now, particularly with reference to FIGS. 2 and 3, the holder 5 will be freely rotated in a plane parallel with the optical axis 0 if the clamp knob 21 is lossend and will be able to be fixed in the rotated position if the clamp knob 5 is screwed in. As evident from this explanation, when the amount of screwing in the clamp knob 21 is properly selected, the magnitude of the frictional force between the pivot 19 and bush 20 will be proper and therefore, for example, as shown in FIG. 6, the holder 5 will be able to be self-held in any desired angular position. Therefore, during the observation, for example, as shown in FIG. 6, if the holder is driven up as it is, even if the observing vessel 26 containing the sample 12 is deep, in case the observing vessel 26 is to be set on the stage 8 or is to be removed from there, the phase difference device 6 will not be in the way. It is convenient. This advantage can be developed likewise also for the differential interference device 7. Further, it can be developed also in the case that one arm 17 is provided on the rotary pillar 13 and the holder 5 is used merely as a condenser holder. That is to say, as shown in FIG. 7, in the case that a single arm 17 is used, if the holding device 4 is ratated to the side opposite the side on which the stage 8 is located, the holding device 4 will not be in the way in replacing the stage or driving up the stage 8 and inspecting the revolver 10. In such case, the holding device 4 will not intercept the illuminating light and the needle point of the micromanipulator or the like to be set on the stage 8 will be able to be roughly set. Also, for example, as shown in FIG. 8, if the holding device 4 is driven up and is rotated to the side opposite the side on which the stage 8 is located, the holding device 4 will not be in the way even in case the large culturing vessel 27 is to be set on the stage 8 or to be removed from there. In this case, too, the holding device 4 will not intercept the illuminating light.

What is claimed is:

1. An inverted-design microscope comprising a microscope body, a pillar erected on said microscope body and supporting a light source means on the top, and a rotary pillar mounted rotatably around said pillar and provided with at least one arm capable of holding an accessory device above a stage.

2. An inverted-design microscope according to claim 1 wherein a plurality of said arms are arranged at regular intervals around said rotary pillar.

3. An inverted-design microscope according to claim 1 wherein said arm is mounted movably in the longitudinal direction of said rotary pillar through a manually operatable rack-pinion means.

4. An inverted-design microscope according to claim 1 wherein a manually operatable means capable of fixing said rotary pillar to said pillar is provided between said pillar and rotary pillar.

5. An inverted-design microscope according to claim 1 wherein said accessory device is a phase difference device or differential interference device.

6. An inverted-design microscope according to claim 1 wherein said accessory device is a phase difference injecting device or stereomicroscope.

7. An inverted-design microscope according to claim 1 wherein said accessory device is a phase difference device, phase difference injecting device or stereomicroscope.

8. An inverted-design microscope according to claim 1 wherein said inverted-design microscope further comprises a holder pivoted rotatably in a plane parallel with said pillar on said arm.

9. An inverted-design microscope according to claim 8 wherein said holder is pivoted on said arm through a pivot inserted rotatably on said arm and secured to said holder and a manually operating means for adjustably giving a frictional force between said pivot and arm.

* * * * *